June 21, 1949.  W. D. TEAGUE, JR  2,473,620
VALVE
Filed Dec. 5, 1944
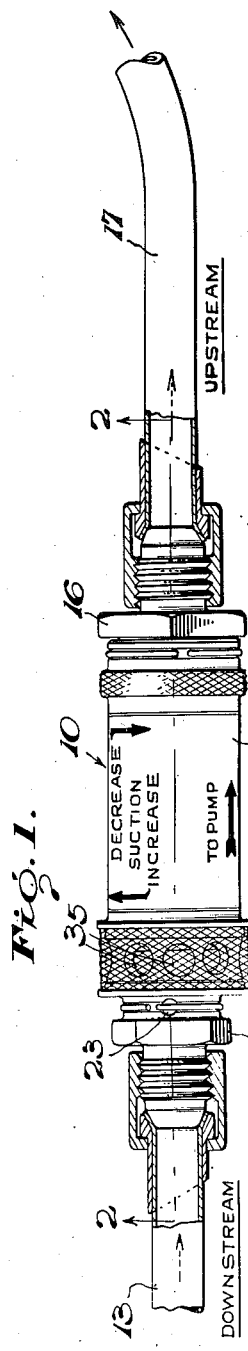
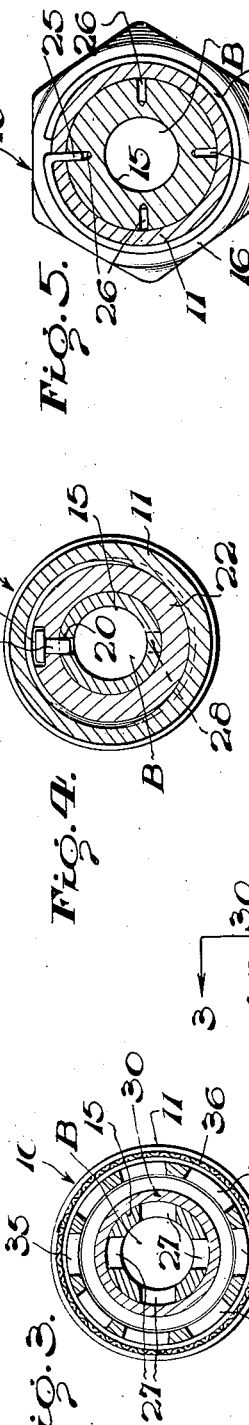
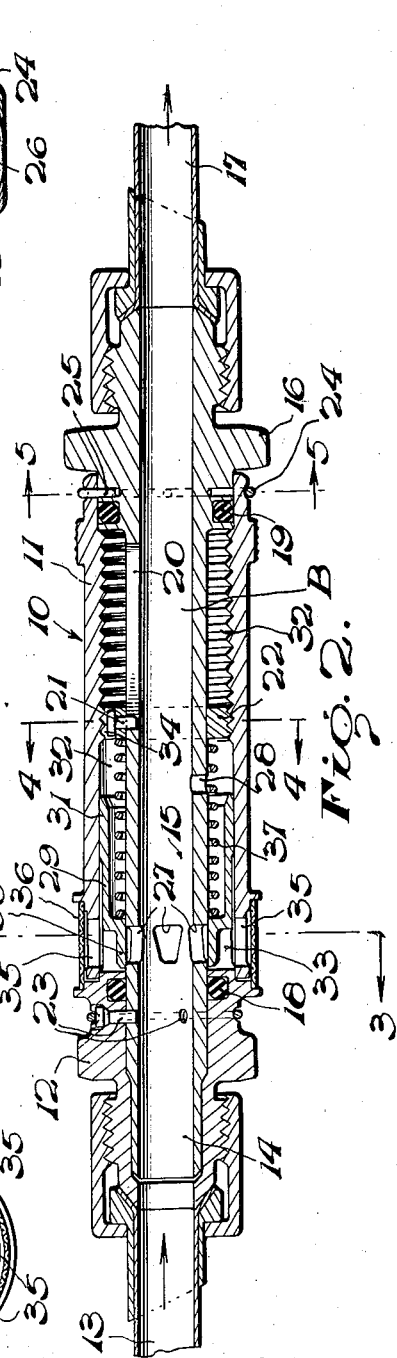
INVENTOR.
Walter D. Teague, Jr.
BY
Robert F. Beck
ATTORNEY Patented June 21, 1949

2,473,620

UNITED STATES PATENT OFFICE 2,473,620

VALVE

Walter D. Teague, Jr., Alpine, N. J., assignor to Bendix Aviation Corporation, Teterboro, N. J., a corporation of Delaware Application December 5, 1944, Serial No. 566,677

4 Claims. (Cl. 251—145)

My invention relates to valves and more particularly to valves of the suction relief type.

One of the objects of my invention is to provide a valve of the foregoing described character which is equipped with flow responsive means of a relatively high sensitivity for controlling the suction therethrough in a manner whereby instruments and devices of a sensitive and precisional type may be accurately operated.

Another object of my invention is to provide a valve of the foregoing described character which is equipped with means for automatically maintaining the suction at a desired value and which may be regulated to modify or change the value.

An important object of my invention is to provide a valve of the foregoing described character which is simple in construction, durable in use, efficient in operation, economical in manufacture, easy of installation and which lends itself to high productivity.

With the above and other objects in view, as will hereinafter appear, the invention comprises the combination and arrangement of parts hereinafter set forth and illustrated in the accompanying drawings, from which the several features of the invention and the advantages attained thereby will be readily understood by those skilled in the art. The feature of a valve piston having respective inner and outer guiding surfaces at opposite ends thereof is claimed in my co-pending application, Serial No. 654,656, Suction throttling valve, filed March 15, 1946.

Referring to the drawings wherein like reference characters designate like parts throughout the several views.

Figure 1 is a side elevation of my invention.

Figure 2 is a sectional view taken substantially along the line 2—2 of Figure 1.

Figures 3, 4 and 5 are sectional views taken substantially along the lines 3—3, 4—4 and 5—5 respectively of Figure 2.

As illustrated in the drawings, the valve 10 is of the instrument suction relief type and is employed in a system for regulating suction below atmospheric pressure or low flow application such as instrument operation. When so employed, the valve is located between a high or varying suction source and the instrument or chamber in which the suction is to be regulated, a specific application being the operation of a gyro-compass, turn and bank indicator and/or artificial horizon from an unsupercharged engine manifold in aircraft.

As disclosed, the valve 10 comprises a housing member or barrel 11 which is closed at one end by means of a relatively rotatable closure member 12 constituting a fitting for connection to the pipe 13 or the like leading to the instrument to be operated or downstream of the system. The fitting 12 is provided with a bore formed inwardly with a counterbore constituting a seat in which is disposed an end section 14 of a tubular pilot member or conduit 15 having a bore or passage B extending throughout its length. The member 15 extends axially through the housing member 11 and is formed with a closure member or collar 16 closing the other end of the housing member. The collar 16 constitutes a fitting similar to the fitting 12 for connection to the pipe 17 or the like leading to the suction source or the upstream of the system.

The fitting 12 and the collar 16 are formed with circumferential grooves in which are contained suitable packings 18 and 19 forming seals between the fitting 12 and section 14 of the pilot member 15 and the collar 16 and the housing member 11 respectively. Between the closure members 12 and 16, the pilot member is disposed in circumspatiality with the housing member 11 and is formed, adjacent the collar 16, with a longitudinal slot 20 slidably receiving the shank end of a headed pin 21 carried by a slide 22 slidably mounted on the pilot member. The housing 11, between its median and the collar 16, is internally threaded for threaded connection with the slide 22, the latter being externally threaded. Obviously, rotation of the housing relative to the pilot member, serves to effect longitudinal movement or adjustment of the slide relative to the pilot member, the purpose of which will hereinafter be made apparent.

The member 12 and section 14 are provided with registering radial openings in which are disposed locking pins 23, the latter being maintained in the openings by means of a resilient split ring detachably carried in a circumferential groove formed about the member 12, whereby relative movement of the members 12 and 14 is precluded. A detachably resilient split ring 24 is disposed in a circumferential groove formed in the member 12 and has one end 25 off-set and extending through an opening in said member and into one of a plurality of sockets 26 formed in the collar 16 of the pilot member to lock the latter to the member 12 to preclude rotary movement therebetween, it being understood that the ring 24 may be removed to effect adjustment of the slide 22 on the pilot member, upon relative rotation of the members 11 and 15 and replaced with the end 25 in one of the sockets 26 to maintain the adjustment. However, the packing 19 serves to normally restrain relative movement of the members 11 and 15, the ring 24 functioning as a guard against accidental relative movement.

Adjacent the member 12, the pilot member 15 is formed about its periphery with a plurality of substantially triangular-shaped ports 27 and with a port 28 adjacent the end of the slot 20. Slidably mounted on the pilot member 15 is a cylindriform valve member 29 which constitutes a piston and is formed, on the end adjacent the member 12 with a valve sleeve 30 and on its opposite end with a head section 31. The head section 31 cooperates with the members 11, 12, 15 and 16 to define a pair of expansible suction and atmospheric chambers 32 and 33 respectively within the housing member.

The slide is transversely slotted to receive the head of the pin 21, the head being disposed inwardly of the threads and thereby establishes a transverse passage 34 through the slide between the slide and the threads. The chamber 32 communicates with the passage B through the port 28 and/or passage 34 while the chamber 33 communicates with the atmosphere by means of inlet openings 35 formed in the wall of the housing member 11 whereby atmospheric pressure is always present in the chamber 33, a screen 36 being provided over the inlet openings 35 to preclude admittance of foreign matter.

The sleeve 30 of the valve member or piston 29 has abutting engagement with the member 12 and serves to control the ports 27 to regulate communication between the passage B and the chamber 33 as hereinafter made apparent. Sleeved about the pilot member 15 is a spring 37 having one end engaging the inner radial end face of the valve sleeve 30 and the opposite end engaging the slide or spring adjusting means 22, said spring urging the valve member 29 toward the member 12 to preclude communication between the passages B and the chamber 33 through the ports 27.

In operation, on starting of the engine or operation of the suction source and with the valve member being disposed towards the member 12 and closing the ports 27, a lowering of pressure in the chamber 32 is obtained and instrument operation is effected. When the differential pressure, between atmospheric and regulated suction times the projected area of the valve member, exceeds the force of the spring 37, the valve member will be actuated towards the slide 22 to gradually open the ports 27 and admit atmosphere air into the passage B to maintain the desired suction value therein. By utilizing a spring with a desired force and rate value, the suction will be regulated within limits dependent upon the spring rate since throttling of the flow by restricting or opening the ports 27 will reduce the regulated suction therethrough. Obviously, by rotating the member 11 relative to the member 15, the slide 22 may be adjusted to vary the tension of the spring 37 and thus change the rate value of the spring in accordance with a desired suction value.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a valve of the class described, a housing, a pilot member having a through passage and extending through said housing and provided with a flow opening and inlet ports communicating with said passage, said housing adapted for movement relative to said pilot member and having atmospheric and suction chambers open to the atmosphere and communicating with said flow opening respectively, valve means slidably mounted on said pilot member and coacting with said housing and said pilot member to define and partition said chambers, and spring means effective for moving said valve means to control communication between said inlet ports and said atmospheric chamber in response to a pressure differential between said chambers, and means responsive to said housing movement for regulating the effectiveness of said spring means relative to said differential pressure.

2. In a valve of the class described, a pilot member having a through passage and provided with a flow opening and ports communicating with said passage, a housing receiving and adapted for movement relative to said pilot member and having atmospheric and suction chambers open to the atmosphere and communicating with said flow opening respectively, a valve member slidably mounted on said pilot member and coacting with said housing and said pilot member to define and partition said chambers, said valve member having a sleeve for controlling communication between said ports and said atmospheric chamber, a spring effective for moving said valve member to control said last mentioned communication in response to a pressure differential between said chambers, and means responsive to said housing movement for regulating the tension of said spring.

3. In a valve of the class described, a valve housing, a pilot member having a through passage and extending longitudinally through said housing and closing the ends of the latter except for the passage through said pilot member, said pilot member being formed with a flow opening and air inlet openings communicating with said passage, a slide slidably mounted on said pilot member and threadedly connected to said housing for axial movement relative to said pilot member upon rotation of said housing relative to said pilot member, a valve member slidably mounted on said pilot member and coacting with the latter and said housing to define suction and atmospheric chambers within said housing communicating with said flow opening and said air inlet openings respectively, a spring interposed between said valve member and said slide for urging said valve member into closed relation with said air inlet openings to preclude communication between said flow opening and said atmospheric chamber, the tension of said spring being adjustable by movement of said slide to permit operation of said valve member only in response to a predetermined pressure differential between said chambers.

4. In a valve of the class described, a valve housing, a pilot member having a through passage and extending longitudinally through said housing and closing the ends of the latter except for the passage through said pilot member, said pilot member being formed with a flow opening and air inlet openings communicating with said passage, a slide slidably mounted on said pilot member and threadedly connected to said housing for axial movement relative to said pilot member upon rotation of said housing relative to said pilot member, a valve member slidably mounted on said pilot member and coacting with the latter and said housing to define suction and atmospheric chambers within said housing communicating with said flow opening and said air inlet openings respectively, a spring interposed between said valve member and said slide for urging said valve member into closed relation with said air inlet openings to preclude communication between said flow opening and said atmospheric chamber, the tension of said spring being adjustable by movement of said slide to permit operation of said valve member only in response to a predetermined pressure differential between said chambers, and means effective for maintaining said slide in an adjusted position.

WALTER D. TEAGUE, Jr.

REFERENCES CITED

The following references are of record in the file of this patent:

UNITED STATES PATENTS

| Number | Name | Date |
| --- | --- | --- |
| 906,039 | LePlain | Dec. 8, 1908 |
| 1,343,375 | Peppercorn | June 15, 1920 |
| 1,505,491 | Price | Aug. 19, 1924 |
| 1,589,224 | Rabe | June 15, 1926 |
| 1,605,643 | Boll | Nov. 2, 1926 |
| 2,211,846 | Brown | Aug. 20, 1940 |